United States Patent
Dai

(10) Patent No.: US 6,595,200 B1
(45) Date of Patent: Jul. 22, 2003

(54) MOBILE HEATER

(76) Inventor: Lei Dai, No.6, Chuang Ye Road, Great Bridge North Road, Nanjing (CN), 210061

(*) Notice: Subject to any disclaimer, the term of this patent is extended or adjusted under 35 U.S.C. 154(b) by 0 days.

(21) Appl. No.: 10/162,975

(22) Filed: Jun. 5, 2002

(51) Int. Cl.[7] .................................................. F24H 3/02
(52) U.S. Cl. ............................. 126/110 B; 126/110 D; 432/222
(58) Field of Search .................... 126/271.2 R, 271.2 A, 126/110 B, 271.2 C, 343.5, 110 D, 110 C; 432/225, 224, 222, 229; 431/344, 345, 343

(56) References Cited

U.S. PATENT DOCUMENTS

| | | | | |
|---|---|---|---|---|
| 3,108,586 A | * | 10/1963 | Wilson | 126/271.2 A |
| 3,174,477 A | * | 3/1965 | Wilson | 126/271.2 A |
| 4,918,844 A | * | 4/1990 | Marsh | 126/271.2 R |
| 5,649,824 A | * | 7/1997 | Stagg et al. | 432/222 |
| 6,152,128 A | * | 11/2000 | Willey | 126/110 B |

* cited by examiner

Primary Examiner—James C. Yeung
(74) Attorney, Agent, or Firm—Joe Nieh

(57) ABSTRACT

A mobile heater that can be easily moved to any location and can be stored and transported in a compact configuration is disclosed. The mobile heater comprises of a housing with a removable combustion chamber that can be removed and reattached as desired and one or more wheels that are movably attached to the housing, means for containing a combustible fuel within said housing, means for controlling and delivering the combustible fuel from said means for containing a combustible fuel to a nozzle attached to said housing, means for igniting said combustible fuel exiting from the nozzle, and means affixed within said housing for generating air movement moving air from behind the nozzle to the front of the nozzle and exit through the removable combustion chamber wherein after said mobile heater may be used to provide heat at desired locations by simply pushing the mobile heater so that it rolls on its attached wheels. The mobile heater may be stored and transported compactly by removing the removable combustion chamber during storage or transportation.

7 Claims, 3 Drawing Sheets

MOBILE HEATER

BACKGROUND—Field of the Invention

The present invention relates generally to a heater. The present invention is a mobile heater that is mounted on wheels that can be easily dismantled for compact storage and transportation.

BACKGROUND—Description of Related Art

Generally, heaters are large and heavy mechanical devices that is difficult to move and bulky to store and transport. Most heaters are of two piece design. One component of the heater is the steel tank that stores a combustible fuel, such as propane. The other component of the heater generally comprises of a housing enclosing a nozzle where the combustible fuel exits, an ignition means to ignite the combustible fuel, a long combustion chamber where the ignited combustible fuel would heat the air, and an electric fan to force the air heated by the combustion of the combustible fuel in the combustion chamber out the long combustion chamber. The combustible fuel from the steel tank is directed through a hose that connects the first component with the second component to exit through a nozzle in the second component.

The prior art design requires a person to physically lift both components, usually one in each hand, to move from one location to another. Furthermore, the prior art design is very bulky due to the one piece design of the component comprising the long combustion chamber. The prior art design is heavy and requires much physical exertion to move from one location to another and is very bulky to store and transport due to the one piece design of the long combustion chamber in the second component.

SUMMARY OF THE INVENTION

The present invention is a mobile heater that can be easily moved to any location and can be stored and transported in a compact configuration. The mobile heater comprises of a housing with a removable combustion chamber that can be removed and reattached as desired and one or more wheels that are movably attached to the housing, means for containing a combustible fuel within said housing, means for controlling and delivering the combustible fuel from said means for containing a combustible fuel to a nozzle attached to said housing, means for igniting said combustible fuel exiting from the nozzle, and means affixed within said housing for generating air movement moving air from behind the nozzle to the front of the nozzle and exit through the removable combustion chamber wherein after said mobile heater may be used to provide heat at desired locations by simply pushing the mobile heater so that it rolls on its attached wheels. The mobile heater may be stored and transported compactly by removing the removable combustion chamber during storage or transportation.

DETAILED DESCRIPTION OF THE PREFERRED EMBODIMENT

Figure 1:
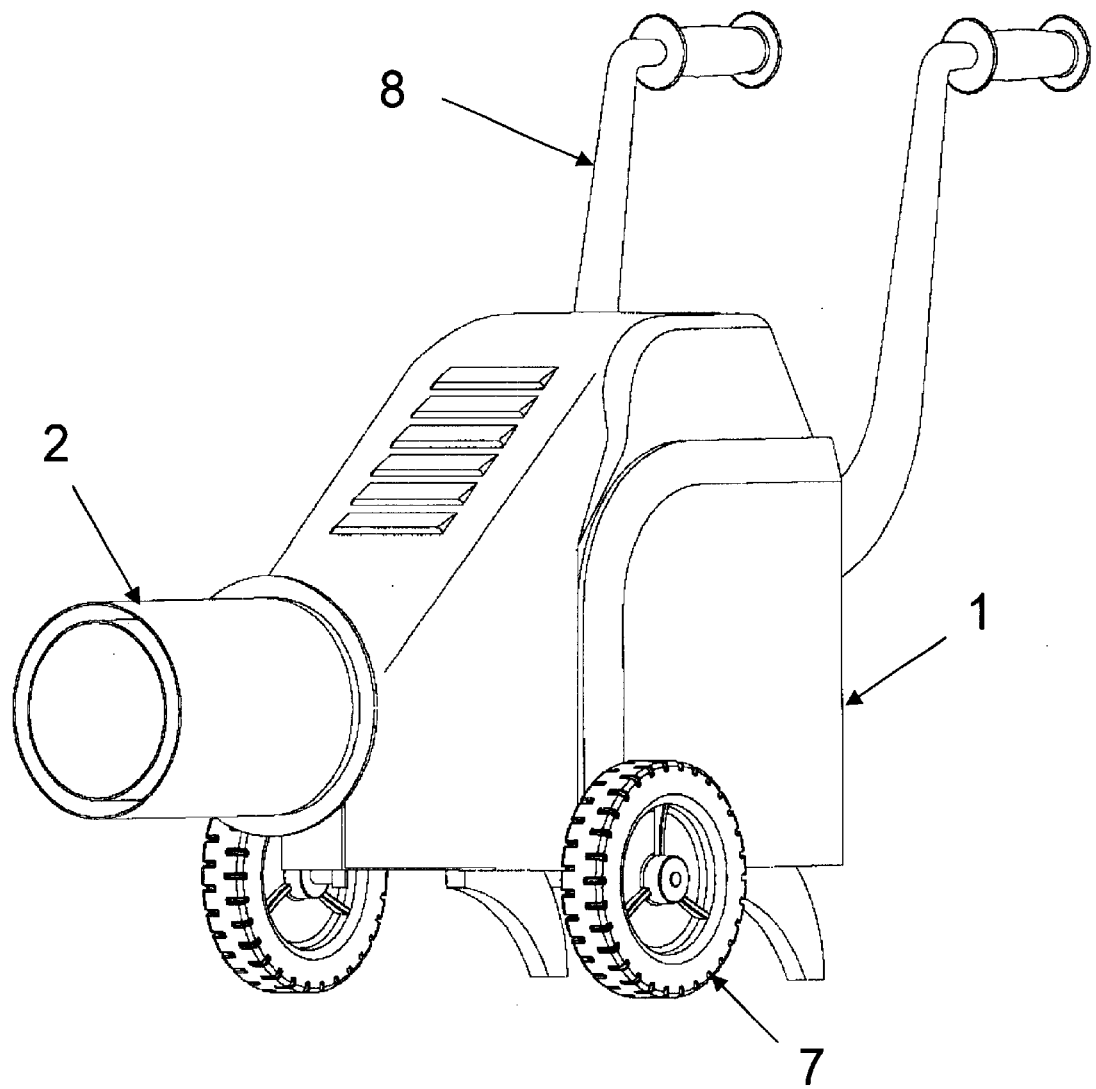
FIG. 1 shows the perspective view of the preferred embodiment of the present invention.
Figure 2:
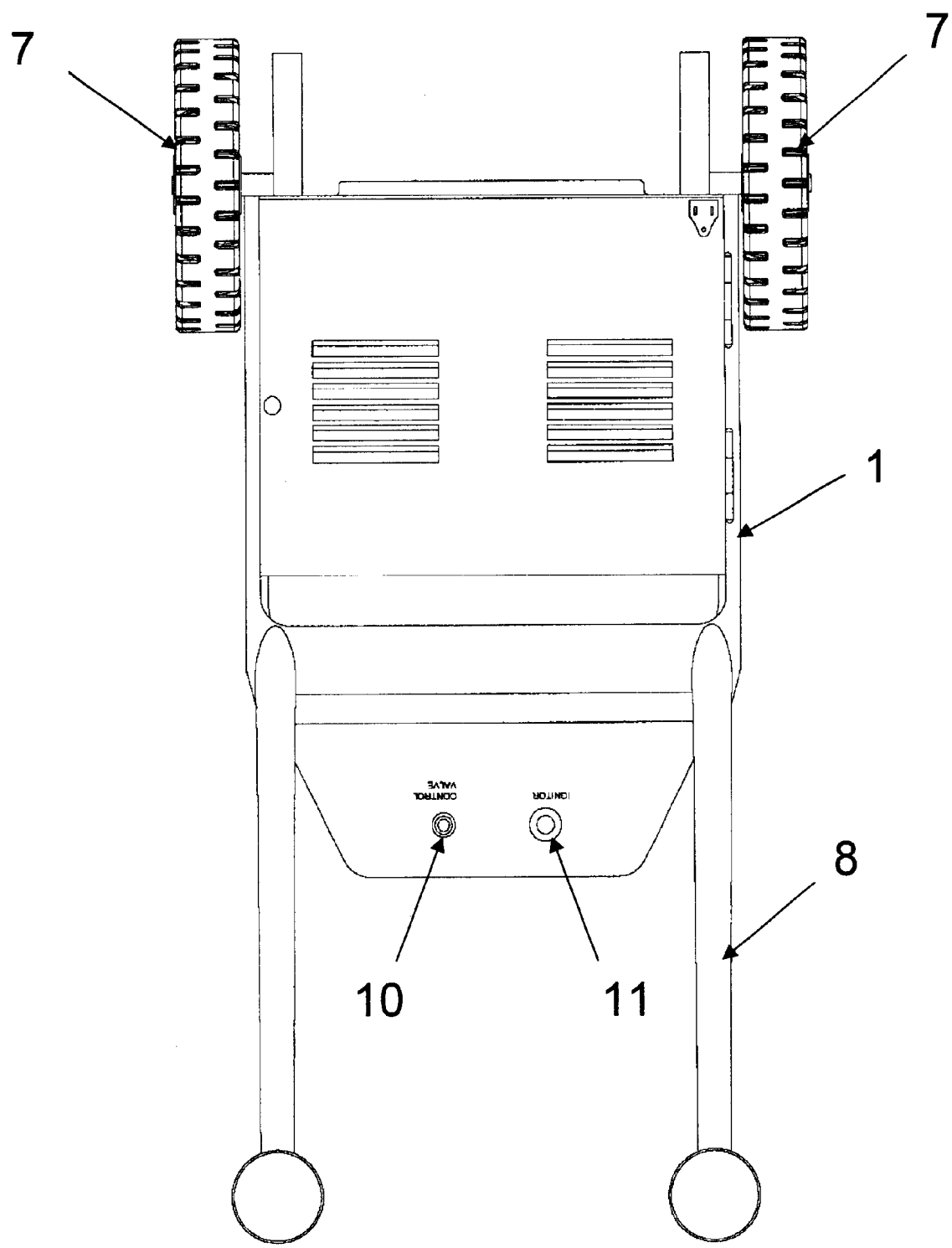
FIG. 2 shows the top view of the preferred embodiment of the present invention.
Figure 3:
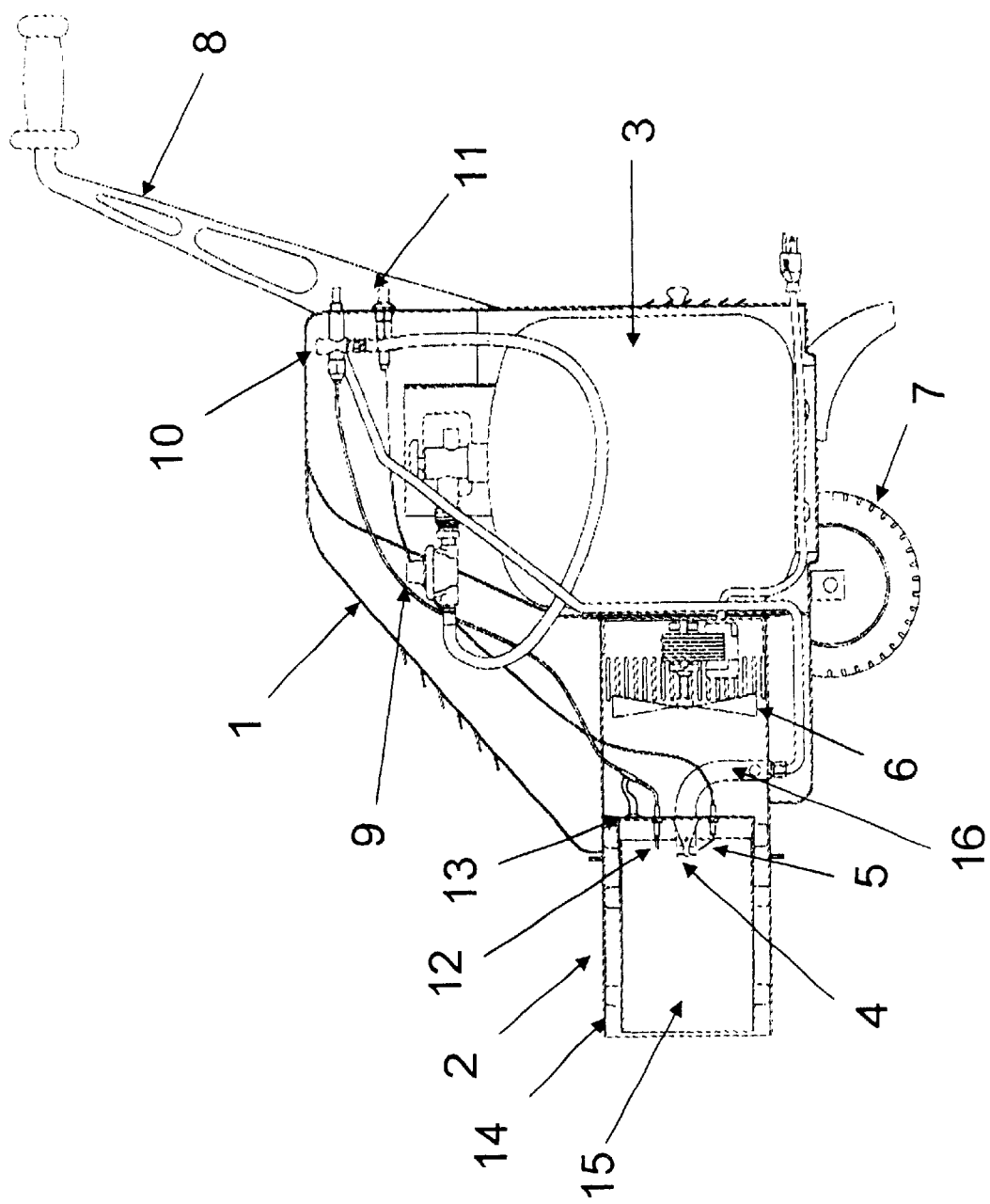
FIG. 3 shows the interior assembly of the preferred embodiment of the present invention.

The preferred embodiment of the mobile heater comprises of a housing 1 with a removable combustion chamber 2 attached to one end. The housing 1 encloses a tank 3 containing combustible fuel such as propane. When the valve 10 on the tank 3 is opened, the combustible fuel is released from the tank 3 and flows through a regulator 9 and directed by a hose through a valve 10 through a mining chamber 16 and then out a nozzle 4 at one end of the removable combustion chamber 2. When the igniter switch 11 is pressed, a spark is generated at the igniter 5 to ignite the combustible fuel exiting at the nozzle 4 generating a flame in the removable combustion chamber 2. A thermal-couple 12 and a temperature sensor 13 are placed near the nozzle 4 to detect the existence of the flame. If the flame is extinguished, the thermal-couple 12 will send a signal to the valve 10 to shut-off the flow of combustible fuel, thereby preventing leakage of the combustible fuel from the tank 3.

An electric fan 6 is affixed behind the nozzle 4 to force air flow across the nozzle 4 and through the removable combustion chamber 2 to exit at the other end of the removable combustion chamber 2. The air heated by the flame at the nozzle 4 is forced out through the removable combustion chamber 2 to provide heat at the other end of the removable combustion chamber 2 which can be directed to any desired direction.

The removable combustion chamber 2 comprises of two concentric cylinders forming an outer chamber 14 and an inner chamber 15. The inner chamber 15 surrounds the nozzle 4 and the flame at the nozzle 4. The outer chamber 14 surrounds the inner chamber 15 and insulates the heated walls of the inner chamber 15 from the outer walls of the removable combustion chamber 2. The removable combustion chamber 2 is removably attached to the housing 1 such that the air flow generated by the electric fan 6 will flow through both the inner chamber 15 and the outer chamber 14 simultaneously. The air flowing through the inner chamber 15 will carry the heat from the flame at the nozzle 4 out the other end of the removable combustion chamber 2. The air flowing through the outer chamber 14 will insulate and cool the outer surfaces of the removable combustion chamber 2.

A set of wheels 7 is movably attached to the bottom of the housing 1 and a pair of handle 8 is attached to the end of the housing 1 opposite the removable combustion chamber 2 to allow the user to easily move the mobile heater to desired location.

The entire movable heater is assembled into one integral mobile package that can be easily moved to any desired location. The removable combustion chamber 2 can be removed for compact storage and for easy transportation of the mobile heater.

What is claimed is:

1. A mobile heater comprising:

a housing with a removable combustion chamber that can be removed and reattached as desired;

means for containing a combustible fuel within said housing;

means for controlling and delivering the combustible fuel from said means for containing a combustible fuel to a nozzle attached to said housing;

means for igniting said combustible fuel exiting from the nozzle; and means affixed within said housing for generating air movement to move air from behind the nozzle to the front of the nozzle and exit through the removable combustion chamber; and one or more wheels movably attached to the housing to allow the mobile heater to be easily moved;

wherein after said mobile heater may be used to provide heat at desired locations.

2. A mobile heater as in claim 1, wherein said means for containing combustible fuel within the housing is a tank.

3. A mobile heater as in claim 1, wherein said means for controlling and delivering the combustible fuel comprises of a regulator attached to the means for containing a combustible fuel with an inlet hose connected to where the combustible fuel exits the regulator to direct the combustible fuel through an adjustable gas valve into a mixing chamber to be mixed with outside air and then directed through a nozzle to be ignited by the ignition means.

4. A mobile heater as in claim 1, wherein the means for generating air movement is an electric fan.

5. A mobile heater as in claim 1, wherein the removable combustion chamber has an inner chamber and a surrounding outer chamber wherein heated air is forced through the inner chamber and unheated air is forced through the surrounding outer chamber to cool the outer surfaces of the removable combustion chamber.

6. A mobile heater comprising:

a housing;

means for containing a combustible fuel within said housing;

means for controlling and delivering the combustible fuel from said means for containing a combustible fuel to a nozzle attached to said housing;

means for igniting said combustible fuel exiting from the nozzle; and means affixed within said housing for generating air movement to move air from behind the nozzle to the front of the nozzle and exit through the removable combustion chamber;

a removable combustion chamber removably attached to said housing wherein the removable combustion chamber has an inner chamber and a surrounding outer chamber wherein heated air is forced through the inner chamber and unheated air is forced through the surrounding outer chamber to cool the outer surfaces of the removable combustion chamber; and one or more wheels movably attached to the housing to allow the mobile heater to be easily moved;

wherein after said mobile heater may be used to provide heat at desired locations.

7. A mobile heater comprising:

a housing;

means for containing a combustible fuel within said housing;

a regulator attached to the tank with an inlet hose connected to where the combustible fuel exits the regulator to direct the combustible fuel through an adjustable gas valve into a mixing chamber to be mixed with outside air and then directed through a nozzle attached to said housing to be ignited by an ignition means;

an electric fan affixed within said housing for generating air movement to move air from behind the nozzle to the front of the nozzle and exit through the removable combustion chamber;

a removable combustion chamber removably attached to said housing wherein the removable combustion chamber has an inner chamber and a surrounding outer chamber wherein heated air is forced through the inner chamber and unheated air is forced through the surrounding outer chamber to cool the outer surfaces of the removable combustion chamber; and one or more wheels movably attached to the housing to allow the mobile heater to be easily moved;

wherein after said mobile heater may be used to provide heat at desired locations.

* * * * *